United States Patent [19]

Byer et al.

[11] Patent Number: 4,739,507

[45] Date of Patent: Apr. 19, 1988

[54] DIODE END PUMPED LASER AND HARMONIC GENERATOR USING SAME

[75] Inventors: Robert L. Byer, Stanford, Calif.; George J. Dixon, Tampa, Fla.; Thomas J. Kane, Redwood City, Calif.

[73] Assignee: Board of Trustees, Stanford University, Stanford, Calif.

[21] Appl. No.: 896,865

[22] Filed: Aug. 15, 1986

Related U.S. Application Data

[63] Continuation-in-part of Ser. No. 674,948, Nov. 26, 1984, abandoned.

[51] Int. Cl.⁴ .............................................. H01S 3/10
[52] U.S. Cl. ...................................... 372/22; 372/66; 372/71; 372/94; 372/101; 372/12
[58] Field of Search ................... 372/21, 22, 69, 71, 372/92, 94, 12, 66, 98, 101

[56] References Cited

U.S. PATENT DOCUMENTS 4,525,843  6/1985  Diels .................................. 372/94

OTHER PUBLICATIONS

Belabaev et al., "Stimulated Emission from Ferroelectric LiNbO₃ Crystals Containing Nd³¹ & Mg²⁺ Ions", Physica Status Solidi A, vol. 28, No. 1, pp K17–K20, 1975.

Primary Examiner—Leon Scott, Jr.
Attorney, Agent, or Firm—Harry E. Aine

[57] ABSTRACT

A second harmonic, optical generator is disclosed in which a laser diode produces an output pumping beam which is focused by means of a graded, refractive index rod lens into a rod of lasant material, such as Nd:YAG, disposed within an optical resonator to pump the lasant material and to excite the optical resonator at a fundamental wavelength. A non-linear electro-optic material such as MgO:LiNbO₃ is coupled to the excited, fundamental mode of the optical resonator to produce a non-linear interaction with the fundamental wavelength producing a harmonic. In one embodiment, the gain medium and the non-linear material are disposed within an optical resonator defined by a pair of reflectors, one of which is formed on a face of the gain medium and the second of which is formed on a face of the non-linear medium. In another embodiment, the non-linear, electro-optic material is doped with the lasant ion such that the gain medium and the non-linear doubling material are co-extensive in volume. In another embodiment, a non-linear, doubling material is disposed in an optical resonator external of the laser gai medium for improved stability of the second harmonic generation process. In another embodiment, the laser gain medium andthe non-linear material are bonded together by means of an optically transparent cement to form a mechanically stable, monolithic structure. In another embodiment, the non-linear material has reflective faces formed thereon to define a ring resonator to decouple reflections from the non-linear medium back to the gain medium for improved stability.

26 Claims, 2 Drawing Sheets

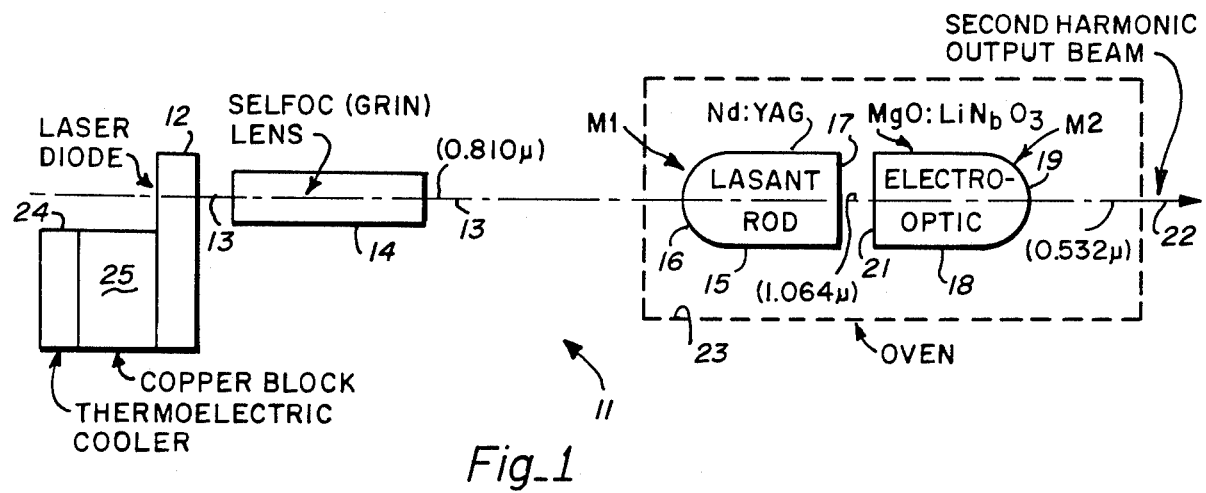
Fig_1
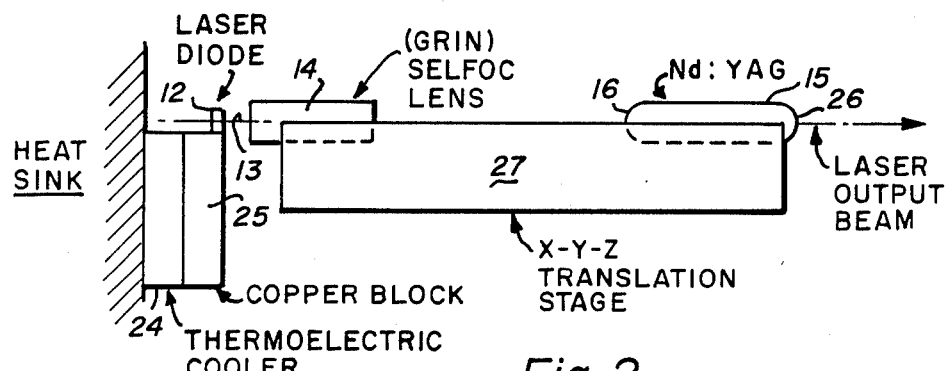
Fig_2
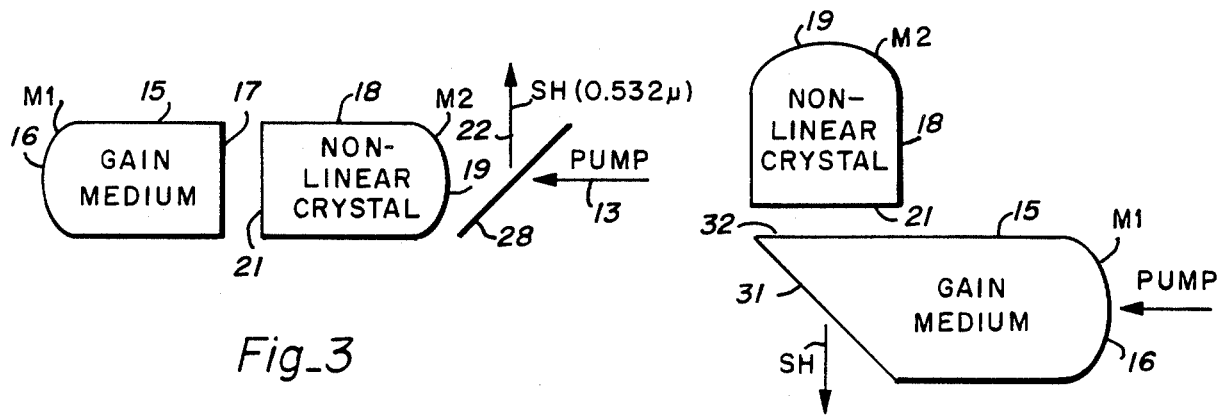
Fig_3
Fig_4

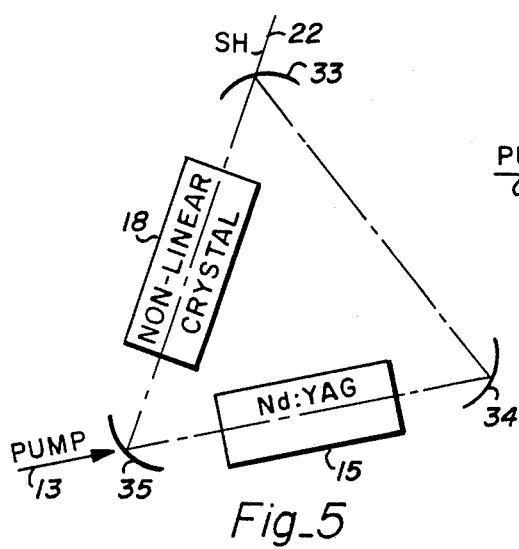
Fig_5
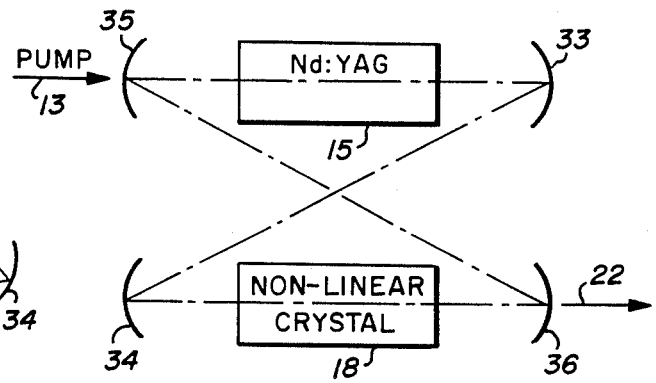
Fig_6
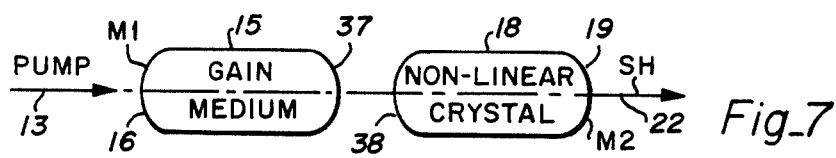
Fig_7
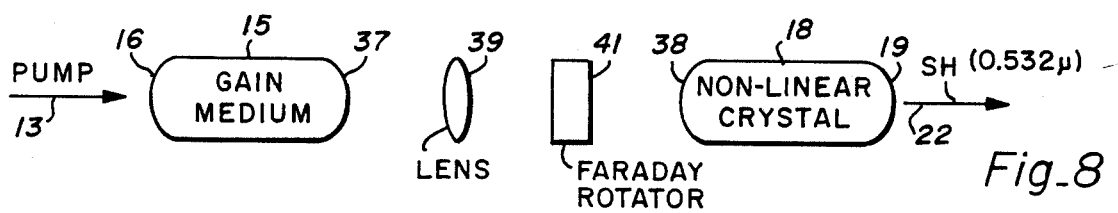
Fig_8
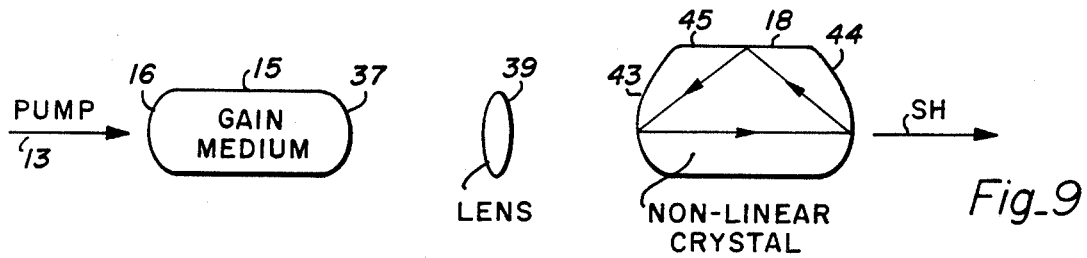
Fig_9
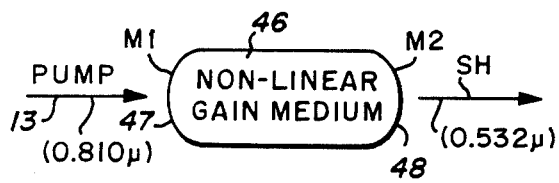
Fig_10
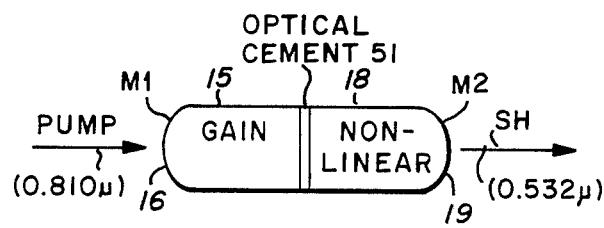
Fig_11

DIODE END PUMPED LASER AND HARMONIC GENERATOR USING SAME

GOVERNMENT CONTRACT

The present invention was made during performance of the following Government Contracts: NASA NAG-1-182 sponsored by the National Aeronautics and Space Administration; ARO DAAG29-81-K-0038 sponsored by the United States Army and an ONR Fellowship sponsored by the United States Navy and the Government has certains rights therein.

RELATED CASES

The present invention is a continuation-in-part invention of parent U.S. Patent Application U.S. Ser. No. 674,948 filed Nov. 26, 1984, now abondoned in favor of the present application.

BACKGROUND OF THE INVENTION

The present invention relates in general to optical harmonic generators and, more particularly, to a diode end pumped laser, the output coherent radiation of which is interacted with an electro-optic non-linear crystal to produce second harmonic coherent radiation.

DESCRIPTION OF THE PRIOR ART

Heretofore, it has been proposed to obtain usable levels of green radiation by doubling the output of a NPP laser pumped by solid-state, near-infrared diodes or laser diodes. The second harmonic generator included an optical resonator consisting of two 5-cm-radius mirrors separated by approximately 20 cms, with a spherical, single-element lens (2.5-cm focal length) placed in the center of the cavity. With this configuration, two small laser mode waists were located at the midpoints between the lens and mirrors. The $Nd^{3+}$ lasant medium, i.e., $NdP_5O_{14}$ (Nd pentaphosphate, NPP) and the doubler crystal of $Ba_2NaNb_5O_{15}$ were placed at the waists. In such an optical resonator, it was demonstrated that second harmonic output at 0.525 microns was obtained with milliwatt pump power levels derived from a dye laser. From these results, it was extrapolated that similar second harmonic generation could be obtained by pumping the NPP crystal with near-infrared pumping radiation derived from semiconductor sources such as light-emitting diodes or laser diodes. Such a laser is disclosed in an article entitled: "Intracavity second-harmonic generation in a Nd pentaphosphate laser", appearing in *Applied Physics Letters*, Vol. 29, pgs. 176–179 (1976).

One of the problems encountered in this prior art second harmonic generator was that the second harmonic output was unstable, i.e., unstable oscillations occurred on the order of a few hundred kHz when the second harmonic output was maximized.

It is also known from the prior art to obtain cw 1.5 mW laser output power at room temperature from a miniaturized Nd:YAG laser. In this laser, a super luminescent diode optically end pumped a 3 mm diameter by 5.4 mm laser rod of Nd:YAG material. The pumping radiation derived from the super luminescent diode was focused by a selfoc lens into the Nd:YAG rod having the optical resonator mirrors coated on opposite ends thereof to produce laser output at 1.06 microns.

Such a laser is disclosed in an article entitled: "Room-temperature cw operation of an efficient miniaturized Nd:YAG laser end pumped by a super luminescent diode", appearing in *Applied Physics Letters*, Vol. 29, No. 11, of Dec. 1, 1976, pgs. 720–722.

It would be highly desirable if a miniatureized, low-power second harmonic generator could be obtained with improved stability.

SUMMARY OF THE PRESENT INVENTION

The principal object of the present invention is the provision of an improved, second harmonic optical generator.

In one feature of the present invention, a non-linear electro-optic material and the lasant material are disposed in an optical resonator structure for resonating the lasant transition in the non-linear material and wherein both the non-linear material and the lasant material have optically reflective faces forming a pair of optical reflectors of the optical resonator, whereby the second harmonic generator is miniatureized and its efficiency improved.

In another feature of the present invention, the lasant ion is doped into the non-linear, electro-optic material so that the lasant energy and the second harmonic energy are generated within the same volume of material thereby miniaturizing the second harmonic generator and reducing its fabrication costs.

In another feature of the present invention, the lasant material is contained within a first optical resonator and the non-linear, second harmonic generating material is contained in a second optical resonator which is excited with optical radiation derived from the first resonator, whereby stability of the second harmonic generation process is enhaced in use.

In another feature of the present invention, a Faraday isolator is disposed inbetween the laser resonator and the second harmonic generating resonator to reduce reflection of energy from the second harmonic generator resonator back to the laser resonator for improving the stability of the second harmonic generation process.

In another feature of the present invention, the optical resonator containing non-linear, electro-optic second harmonic generating material is a ring resonator for improving the stability of the second harmonic generation process.

In another feature of the present invention, the member of lasant material is bonded to the member of non-linear, electrooptic material via the intermediary of an optically transparent cement, whereby a monolithic second harmonic generator structure is obtained and fabrication costs are reduced.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram of a second harmonic, optical generator incorporating features of the present invention, FIG. 2 is a schematic line diagram of a laser diode end pumped laser incorporating features of the present invention, FIG. 3 is a schematic line diagram of an alternative embodiment of a second harmonic generator of the present invention, and FIGS. 4–11 are schematic line diagrams of alternative, second harmonic generators incorporating features of the present invention.

DESCRIPTION OF THE PREFERRED EMBODIMENTS

Referring now to FIG. 1, there is shown a second harmonic, optical generator 11 incorporating features of the present invention. A laser diode 12, such as a model SDL-1400-C GaAlAs multihetrojunction diode laser from Spectra Diode Labs of San Jose, Calif., produces a beam of coherent, optical radiation of a wavelength falling within a band of 780 to 840 nanometers. The output radiation is a beam 13 having a beam divergence of 20° to 35°, depending upon whether the beam is parallel to the junction plane or perpendicular to the junction plane.

A graded refractive index-rod lens 14, or an appropriate aspheric lens, is closely spaced to the laser diode as by 0.002" to 0.015" to receive the laser diode beam 13 and to focus and image the beam into a lasant rod 15, as of Nd:YAG crystal or Nd:glass, for optical pumping thereof. In a typical example, lens 14 is a model SLS-2.0—.25 BC—.83, available from NSG America of Clark, N.J., having a pitch of 0.25 millimeters and coated on opposite ends with anti-reflection coatings designed for passing radiation at 0.810 microns wavelength. Lens 14 is a graded refractive index-rod of the type described in an article appearing in International Fiber Optics and Communications magazine, 1982 entitled: "Selfoc Technology: It's Applications," by Kenzo Sona.

In a typical example, the lasant rod 15 has a diameter of 3 millimeters and a length of 6 millimeters. Its input face 16 is convex to the incident beam 13 having a radius of curvature of 10 millimeters and is coated with dielectric coatings to have a reflectivity greater than 99.5% at the laser output wavelength of 1.064 microns and a reflectivity for the pumping energy at 0.810 microns of less than 20%. The output face 17 of the lasant rod 15 is planar and is coated with a dielectric anti-reflection coating for the 1.064 micron wavelength energy.

The pumping beam 13 optically pumps lasant transitions of the lasant rod 15 at the desired output wavelength of 1.064 microns. An electro-optic non-linear crystal 18, as of magnesium oxide doped lithium niobate, is disposed generally collinearly with the axis of the pumping beam 13. The electro-optic crystal 18 has a convex output face 19 with a radius of curvature of approximately 10 millimeters and is coated with dielectric coating material to provide a reflectivity greater than 99.5% at 1.064 microns and a reflectivity of less than 20% at 0.532 microns wavelength. In a typical example, the non-linear electro-optic crystal 18 has a diameter of 3 millimeters and length of 5 millimeters. The planar left-hand or input face 21 is coated with an anti-reflective, dielectric coating for energy at 1.064 microns wavelength.

The input and output faces 16 and 19 of the crystals 15 and 18 form the mirror reflectors $M_1$ and $M_2$ of an optical resonator which is excited and tuned for resonance at 1.064 microns wavelength. The excited fields of the resonator interact with the lasant transitions of the lasant rod 15 to produce a laser oscillator at 1.064 microns. The excited $TEM_{00}$ mode of the optical resonator interacts with the electro-optic non-linear crystal 18 in a manner as described in an article entitled: "Theory of IntraCavity Optical Second Harmonic Generation", appearing in the *Journal of Quantum Electronics*, Vol. QE6, No. 6 of April 1970, pgs. 215–223 to efficiently produce second harmonic radiation which passes out of the optical resonator through output mirror 19, as beam 22, and having a coherent wavelength of 0.532 microns in the green band.

The lasant rod 15 and the electro-optic non-linear crystal 18 are disposed within a temperature controlled oven 23, the temperature of which can be varied in order to obtain optimum conversion efficiency for the second harmonic generation. In addition, the laser diode is cooled by means of a thermoelectric cooler 24 coupled in good heating exchanging relation with the laser diode 12 via the intermediary of a copper block 25.

The second harmonic generator 11 of the present invention is particularly advantageous in that it has small size, mechanical stability, small laser mode volume, low threshold and efficient, harmonic generation at low pump power levels.

In the present invention, the diode laser pumped Nd:YAG oscillator yields advantages of diffraction limited spatial mode, narrower spectral linewidth and higher cavity circulating power. These advantages are referred to collectively as brightness amplification. High brightness is essential for efficient, second harmonic generation.

In contrast, one diode laser itself has lower spatial mode quality, wider spectral width and much lower circulating power and, therefore, does not double efficiently in known, non-linear media. The temperature stability of the crystalline laser wavelength is much better than the diode laser wavelength which is an advantage in many applications. The crystalline laser media also offers the advantages of storage of optical energy which in turn allows Q-switching, spiking, and mode locking to enhance the output peak power relative to that of the pump diode laser source. Higher peak powers also lead to enhanced, harmonic generation efficiency.

Referring now to FIG. 2, there is shown a diode laser end pumped Nd:YAG laser incorporating features of the present invention. The laser is similar to the laser portion of the second harmonic generator of FIG. 1 in that the laser diode 12 is coupled in good heat exchanging relation with a copper block 25 which is thence cooled by a thermoelectric cooler 24. The output beam 13 of the laser diode 12 is focused and imaged by a graded refractive index rod lens (GRIN) 14 into a neodymium YAG laser rod 15. The input face 16 of the laser rod 15 has a radius of curvature of 19 millimeters and a reflectivity at the laser wavelength of 99.9% of 1.064 microns. Likewise, the output face 26 of the YAG crystal 15 has a radius of curvature of 19 millimeters and a reflectivity of 99.7% at 1.064 microns. The GRIN lens 14 and laser rod 15 are held in a groove in a 3 orthogonal axis (XYZ) translational stage 27 for conduction cooling of the lens and laser rod 15 while permitting proper translational adjustments to achieve optimum alignment of the laser rod 15 with the pumping diode laser beam 13. In a typical example of the laser of FIG. 2, the laser diode produces an output beam of single mode CW radiation of approximately 20 milliwatts for optical pumping of the laser rod 15. Overall efficiency of 3.5% has been achieved with the laser rod operating in the $TEM_{00}$ mode. Extreme frequency stability and long coherence length have been achieved in the free running mode.

Suitable materials for the nonlinear electro-optic material include: $KNbO_3$, $KTiOPO_4$, $LiIO_3$, $LiNbO_3$, $LiNbO_3$:MgO, $Ba_2NaNb_5O_{15}$, $\beta$-barium borate and $Nd:MgO:LiNbO_3$. Suitable lasant rod materials include:

Nd:LiNbO$_3$:MgO, stochiometric Nd compounds such as NdP$_5$O$_{14}$, NdLiP$_4$O$_{12}$, NdKP$_4$O$_{12}$, NdK$_3$(PO$_4$)$_2$, NdAl$_3$(BO$_3$)$_4$, Ndk$_5$(MoO$_4$)$_4$, NdNa$_5$(WO$_4$)$_4$ and neodymium garnets such as Nd:YALO$_3$, Nd:GGG and Nd:YAG and other neodymium doped garnets are described in a book entitled "LASER CRYSTALS" by Alexander A. Kaminskii, published by Springer Verlag (1981) New York, and neodymium glasses such as LHG-8 and LHG-5 glasses manufactured by Hoya Inc. of Tokyo, Japan.

Referring now to FIG. 3, there is shown an alternative embodiment of the second harmonic generator of FIG. 1 wherein the optical resonator is pumped through the output mirror M$_2$. In this embodiment, the pumping beam 13 is focused into the gain medium 15 through a beam splitting mirror 28. The beam splitting mirror 28 allows the pumping radiation to pass therethrough but reflects the second harmonic at 0.532 microns.

In this embodiment, the mirror surface M$_1$ has a high reflectivity, (greater than 99%) at the fundamental wavelength 1.064 microns of the optical resonator. The flat planar faces 17 and 21 are coated with antireflective coatings at the fundamental and provide high transmissivity, i.e., greater than 80% at the second harmonic wavelength of 0.532 microns. The output mirror face M$_2$ at 19 has high reflectivity, i.e., greater than 99% at the fundamental wavelengths and high transmission at the pump and second harmonic wavelengths of 0.810 and 0.532 microns, respectively. The pump 13, as in the embodiment of FIG. 1, includes the laser diode 12 and graded refractive index lens 14 to image the diode laser mode into the gain medium 15.

Referring now to FIG. 4, there is shown an alternative right-angle optical resonator incorporating features of the present invention. In this embodiment, surface 16 of the gain medium has a high reflectivity, i.e., greater than 99% at the fundamental wavelength of 1.064 microns and a high transmission, i.e., greater than 80%, at the pump wavelength of 0.810 microns. The output end of the gain medium rod 15 is cut at a 45 degree angle for internally reflecting the fundamental radiation at right angles into the nonlinear crystal 18. The cut end of the laser rod 15, at face 31, has a high reflectivity, i.e., greater than 99% for the fundamental at 1.064 microns and a high transmissivity of greater than 80% for the second harmonic radiation at 0.532 microns. The exit face 22 of the gain rod, which faces toward the nonlinear crystal 18, has an anti-reflection coating for the fundamental and second harmonic wavelengths. The input face 21 of the nonlinear crystal has an anti-reflection coating for the fundamental and second harmonic. The second mirror face M$_2$ 19 of the nonlinear crystal has a high reflectivity, i.e., greater than 99% for the fundamental and high reflectivity greater than 80% for the second harmonic. These coatings are arranged to provide equal phase shift for reflections of the second harmonic and fundamental.

Referring now to FIG. 5, there is shown an alternative optical resonator embodiment of the present invention. More particularly, in this embodiment, three mirrors 33, 34 and 35 are arranged for reflecting the fundamental wavelength around in a triangular ring. The gain medium rod 15 and nonlinear crystal rod 18 are located on the fundamental beam path of the ring resonator. Pumping radiation is fed through one of the mirrors 35 into the gain medium 15 for pumping the laser gain medium 15 and exciting the ring resonator at the fundamental laser frequency of 1.064 microns. One or more of the mirrors are coated such that they have relatively high transmissivity at the second harmonic. All the crystal faces are coated with anti-reflection coatings. One or more of the mirrors may be formed on the ends of one or more of the crystals 15 and 18. The advantage of the ring resonator is the ability to put multiple beam waists within the optical resonator. This allows optimization of both pump and harmonic generation geometries.

Referring now to FIG. 6, there is shown an alternative optical ring resonator configuration similar to that of FIG. 5 except that it employs only one additional mirror 36.

Referring now to FIG. 7, there is shown an alternative embodiment of the present invention. The embodiment of FIG. 7 is essentially the same as that of FIG. 1 with the exception that the mutually opposed end faces of the gain medium 15 and nonlinear crystal 18 at 37 and 38 are curved to provide lenses within the optical resonator. The lenses are shaped to achieve desirable changes in the mode shape within the respective crystals 15 and 18, respectively. More particularly, they are shaped to produce confocal conditions in the non-linear crystal and optimum mode volume in the gain crystal 15. Surface 16 has a high reflectivity, i.e., greater than 99% for the fundamental and high transmission, i.e., greater than 80% for the pump wavelength. Surfaces 37 and 38 have anti-reflection coatings for the fundamental and high transmission coatings, i.e., greater than 80% for the harmonic. The output surface 19 has high reflectivity greater than 80% for the harmonic.

Referring now to FIG. 8, there is shown an alternative embodiment of the present invention. The embodiment of FIG. 8 is similar to that of FIG. 7 with the exception that a lens 39 and a Faraday rotator 41 are disposed between the gain medium 15 and the non-linear crystal 18. The input face of the gain medium 16 has a high reflectivity greater than 99% at the fundamental and a high transmission, i.e., greater than 80% at the pump wavelength. The output face 37 of the gain medium has a high reflectivity greater than 95% of the fundamental and a high reflectivity greater than 60% of the pump wavelength. The lens 39 is coated with an anti-reflective coating at the fundamental and may comprise a GRIN lens similar to that shown at 14 in FIG. 1. The input face of the non-linear crystal 18 has a high reflectivity at the fundamental, i.e., greater than 95% and a high reflectivity at the harmonic of 0.532 microns. The coatings are arranged to provide identical phase shift for the harmonic and for the fundamental. As an alternative, face 38 may have a high reflectivity at the fundamental, i.e., greater than 95% and high transmission, i.e., greater than 80% at the harmonic.

The output face 19 of the non-linear crystal has a high reflectivity of greater than 99% at the fundamental and a high transmission, i.e., greater than 80% at the harmonic. Surfaces 16 and 37 of the gain medium 15 form an optical resonator at the fundamental. Faces 19 and 38 of the non-linear crystal form resonator mirrors around the non-linear crystal. The Faraday rotator 41 decouples the doubling resonator reflections from the fundamental beam. The lens 39 allows matching of the laser resonator output to the non-linear optical resonator. The two optical resonators are caused to resonate through a combination of temperature control, electro-optic control and/or stress control. Phase matching is achieved through temperature or angle control.

The embodiment of FIG. 8 has the advantage of allowing a selection of optimum parameters for the design of the laser including the gain medium and for the parameters determining the second harmonic generation process in the non-linear crystal 18. Also, the resultant, second harmonic generator has enhanced stability due to the decoupling of the harmonic generator crystal 18 from the laser gain medium 15.

Referring now to FIG. 9, there is shown an alternative embodiment similar to that of FIG. 8 with the exception that the Faraday rotator 41 and non-linear crystal 18 are replaced by a non-linear crystal 18 having faces formed thereon to provide an internal ring optical resonator. In this embodiment, surface 16 of the gain medium has high reflectivity, i.e., greater than 99% at the fundamental and high transmissivity, i.e., greater than 80% at the pump wavelength. The output face 37 of the gain medium has a high reflectivity, i.e., greater than 95% of the fundamental and a high reflectivity, i.e., greater than 60% of the pump wavelength. The lens 39 has anti-reflective coatings at the fundamental. The input face 43 of the non-linear crystal 18 has high reflectivity at the fundamental. The output face of the non-linear crystal 44 has high reflectivity at the fundamental and high transmissivity, i.e., greater than 80% at the harmonic. Surface 45 of the non-linear crystal 18 is uncoated and provides total internal reflection at the fundamental wavelength. Use of the ring resonator for the non-linear crystal 18 eliminates reflections into the gain medium 15. The gain medium 15 may also be formed in a ring configuration of monolithic design similar to that of the non-linear crystal 18.

Referring now to FIG. 10, there is shown an alternative embodiment to that of FIG. 1. In this embodiment, the gain medium and non-linear electro-optic material comprise one in the same crystal material. A suitable material which is both non-linear and a gain medium is Nd:MgO:LiNbO$_3$. In this embodiment, input face 47 of the non-linear gain medium 46 is coated to provide high reflectivity, i.e., greater than 99% of the fundamental (1.064 microns) and high transmission, i.e., greater than 80% at the pump and the harmonic wavelengths, 0.810 microns and 0.532 microns, respectively. Alternatively, the coating on face 47 can have high reflectivity, i.e., greater than 99% at the fundamental and high reflectivity, i.e., greater than 80% of the harmonic with high transmissivity of greater than 80% at the pump wavelength. The coatings should be formed in this case such that the phase shifts for both the fundamental and the harmonic are identical.

The output face 48 of the non-linear gain medium 46 is coated to provide high reflectivity, i.e., greater than 95% of the fundamental and high transmission, i.e., greater than 80% of the harmonic. An advantage of the non-linear gain medium 46 in the second harmonic generator embodiment of FIG. 10 is that fabrication costs are reduced inasmuch as only a single member of non-linear gain medium replaces both the separate gain medium and non-linear crystals 15 and 18, respectively.

Referring now to FIG. 11, there is shown an alternative embodiment of the present invention. This embodiment is similar to that of FIGS. 1, 3, 4 and 7 in that the gain medium 15 and a non-linear, electro-optical medium 18 are closely spaced but in the embodiment of FIG. 11, the two members 15 and 18 are bonded together by means of a layer of optical cement 51 which is optically transparent at the wavelengths of interest.

The advantage to the monolithic design of FIG. 11 is that the size of the second harmonic generator is reduced, its mechanical stability improved, it offers smaller laser mode volume and has attendant lower threshold for efficient, harmonic generation at low pump power levels. All of the aforecited, previously described embodiments of FIGS. 1, 3, 4 and 7 may be advantageously bonded together in the manner as described with regard to the embodiment of FIG. 11. Also, in these embodiments, the opposed faces 17 and 21 between the gain medium and the non-linear medium need not be normal to the resonator axis. A non-orthogonal surface oriented properly with respect to the polarization axis of the non-linear crystal can act as a polarizer to provide proper laser polarization for harmonic generation.

What is claimed is:

1. In a method for harmonically generating coherent, optical radiation from a non-linear optical material, the steps of:

generating a beam of coherent, optical pumping radiation of a first optical wavelength from a diode laser;

directing the beam of optical pumping radiation derived from the laser diode into a member of lasant material for efficient, optical pumping of the lasant material and to excite coherent, optical lasant radiation at a second wavelength;

interacting the coherent, optical lasant radiation at said second wavelength with a member of non-linear, optical material to harmonically generate coherent, optical radiation at a third wavelength harmonically related to said lasant radiation at said second wavelength;

resonating the coherent, lasant radiation at said second wavelength by reflecting said lasant radiation between a plurality of optical reflectors for the second wavelength with the resonated, lasant radiation as reflected between said reflectors also passing through said lasant material and through said non-linear, optical material, and forming at least one of said optical reflectors on a face of said lasant material and forming a second one of said optical reflectors on a face of said non-linear, optical material.

2. The method of claim 1 including the step of forming the member of lasant material and the member of non-linear, optical material to be generally co-extensive in volume by doping the non-linear, optical material with a lasant ion.

3. The method of claim 1 including the step of forming a plurality of optical reflectors at the second wavelength on a plurality of faces of said member of lasant material and reflecting the lasant radiation at said second wavelength between said reflective faces of said lasant material and through said lasant material to define a first, optical resonator containing said lasant material;

forming a plurality of optical reflectors at the second wavelength on a plurality of faces of said member of non-linear, optical material and reflecting the lasant radiation at said second wavelength between said reflective faces of said member of non-linear, optical material and through said non-linear material to define a second, optical resonator containing said non-linear, optical material; and exciting said second, optical resonator with lasant radiation at said second wavelength derived from said first, optical resonator.

4. The method of claim 3 wherein the step of forming a plurality of optical reflectors at the second wavelength on a plurality of faces of said member of non-linear, optical material includes forming at least three, optical reflectors at the second wavelength on at least three faces of said member of non-linear, optical material and reflecting the lasant radiation at said second wavelength between said three reflectors and through said non-linear, optical material to define a ring-type, second, optical resonator containing said non-linear, optical material, whereby reflection of power from the non-linear material back into the lasant material in said first, optical resonator is reduced.

5. The method of claim 3 including the step of passing the lasant, optical radiation at said second wavelength and derived from said first, optical resonator through a Faraday rotator before passing same into said second resonator for excitation thereof for decoupling said first, optical resonator from reflections of optical radiation from said second, optical resonator at said second wavelength.

6. In a method for harmonically generating coherent, optical radiation the step of:
   optically pumping a member of lasant material with the output beam of a semiconductive diode at a first wavelength;
   disposing the optically pumped lasant material in a first, optical resonator for exciting coherent, optical resonance of said first, optical resonator at a second optical wavelength; and
   doubling the frequency of said coherent, optical radiation at said second wavelength in a doubling material disposed in a second, optical resonator to derive output coherent, optical radiation at a third wavelength corresponding to the second harmonic of said second wavelength.

7. The method of claim 6 including the steps of internally reflecting optical radiation at said second wavelength off of a plurality of faces of the doubling material to define the second, optical resonator containing said doubling material.

8. The method of claim 7 wherein the step of internally reflecting the optical radiation off the faces of said doubling material includes the step of internally reflecting such radiation off of at least three faces of said doubling material to define an optical ring resonator as said second, optical resonator.

9. In a method for harmonically generating coherent, optical radiation, the steps of:
   optically pumping a lasant member of non-linear, optic, lasant material disposed in an optical resonator with the output beam of a diode at a first wavelength to excite coherent, optical resonance of said optical resonator at a second, optical wavelength corresponding to a lasant transition of said lasant member; and
   doubling the frequency of said coherent, optical radiation at said second optical wavelength within said member of non-linear optic, lasant material to derive output coherent, optical radiation at a third wavelength corresponding to the second harmonic of said second wavelength.

10. The method of claim 9 including the step of internally reflecting optical radiation at said second wavelength off of a plurality of faces of said member of non-linear, optic, lasant material to define said optical resonator containing said member of non-linear, optic, lasant material.

11. In a method for harmonically generating coherent, optical radiation, the steps of:
   optically pumping a lasant, solid material with the output beam of a diode at a first wavelength to excite a lasant transition of said lasant material and for emitting optical radiation at a second wavelength;
   internally reflecting the emitted, coherent, optical radiation at said second wavelength between faces of said solid lasant material and said solid, non-linear, optical material for resonating the emitted lasant, optical radiation at said second wavelength within said solid, non-linear and solid, lasant materials.

12. The method of claim 11 including the step of coating said faces of said solid, non-linear and solid, lasant materials to cause said faces to be internally reflective at said second wavelength.

13. The method of claim 1 including the step of bonding the member of lasant material to the member of non-linear, optic material by means of a layer of optically transparent adhesive to form a monolithic structure including said member of lasant and non-linear materials.

14. In an apparatus for harmonically generating coherent, optical radiation from a non-linear optical material:
   diode laser means for generating a beam of coherent, optical pumping radiation of a first optical wavelength from a diode junction;
   a member of lasant material disposed to receive optical pumping radiation derived from said laser diode means for efficient, optical pumping of said lasant material and for exciting coherent, optical lasant radiation at a second wavelength emanating from said member of lasant material;
   a member of non-linear, optical material disposed to receive the coherent, optical lasant radiation at said second wavelength for harmonically generating coherent, optical radiation at a third wavelength harmonically related to said lasant radiation at said second wavelength;
   optical resonator means for resonating coherent, lasant radiation at said second wavelength by reflecting the lasant radiation between a plurality of optical reflectors for the second wavelength of said resonator means with the resonated, lasant radiation passing through said lasant material and through said non-linear optical material for enhancing the harmonic generation process; and
   said resonator means having at least one of said optical reflectors on a face of said member of lasant material and a second one of said optical reflectors on a face of said member of non-linear optical material.

15. The apparatus of claim 14 wherein said member of lasant material and said member of non-linear optical material are formed to be generally co-extensive in volume by doping the non-linear optical material with a lasant ion.

16. The apparatus of claim 14 wherein said resonator means includes first and second optical resonators with the first optical resonator defined by a plurality of reflective faces of said member of lasant material and said second optical resonator being defined by a plurality of optically reflective faces of said member of non-linear optical material; and wherein said first and second optical resonators are optically coupled together such that said second optical resonator is excited with lasant radiation at said second wavelength derived from said first optical resonator.

17. The apparatus of claim 16 wherein said second optical resonator is defined by at least three optical reflective faces of said member of non-linear optical material to define a ring type second optical resonator containing said non-linear optical material, whereby reflection of power from the non-linear optical material back into the lasant material in said first optical resonator is reduced.

18. The apparatus of claim 16 including Faraday rotator means disposed between said first and second optical resonators for de-coupling said first optical resonator from reflections of optical radiation from said second optical resonator at said second wavelength, whereby the stability of the second harmonic generation process is enhanced.

19. The apparatus of claim 14 including a layer of bonding material disposed inbetween said member of lasant material and said member of non-linear optic material for bonding said members together, said layer of bonding material being optically transparent, whereby a monolithic structure including said members of lasant and non-linear materials is obtained.

20. In an optical, harmonic generator:
a first optical resonator means for resonating optical radiation;
a member of lasant material disposed within said first optical resonator for exciting said resonator with coherent, optical radiation;
a semiconductive diode for emitting optical pumping radiation at a first wavelength for optically pumping said member of lasant material disposed within said first optical resonator means;
second optical resonator means optically coupled to said first optical resonator means for resonating optical radiation emanating from said member of lasant material; and
a member of non-linear optic material disposed within said second optical resonator means for multiplying the frequency of the coherent, optical radiation emanating from said lasant material to derive output coherent, optical radiation of a wavelength corresponding to a harmonic of the optical radiation emanating from said member of lasant material.

21. The apparatus of claim 20 wherein said second optical resonator means is defined by faces of said member of non-linear optic material for internally reflecting optical radiation between said faces.

22. The apparatus of claim 21 wherein said second optical resonator means includes at least three internally reflective faces of said member of non-linear optic material to define an optical ring resonator as said second optical resonator means.

23. In an optical, harmonic generator:
optical resonator means for resonating optical radiation therein;
a member of non-linear optic lasant material disposed within said optical resonator means for exciting said resonator means at a wavelength corresponding to the lasant transition of said non-linear optic lasant material;
semiconductive diode means for emitting a beam of optical pumping radiation into said member of non-linear optic lasant material for optically pumping said material to excite coherent, optical resonance of said optical resonator at an optical wavelength corresponding to a lasant transition of said lasant material and said non-linear optic lasant material multiplying the frequency of said lasant transition to obtain coherent, optical radiation at a wavelength corresponding to a harmonic of the wavelength of said excited lasant transition.

24. The apparatus of claim 23 wherein said member of non-linear optic lasant material includes a plurality of internally reflective faces between which the optical radiation at the wavelength of said lasant transition is reflected to define said optical resonator means.

25. In an optical, harmonic generator:
diode means including a semiconductive diode junction for emitting an optical pumping beam of radiation at a first wavelength;
a member of solid lasant material optically coupled to the optical pumping radiation of said diode to excite a lasant transition of said lasant material and for emitting optical radiation at a second wavelength;
a member of non-linear optic material optically oupled to the emitted optical radiation emitted from said lasant member at said second wavelength for emitting coherent, optical radiation at a third wavelength harmonically related to said second wavelength; and
said members of lasant and non-linear, optical material including internally reflective faces for resonating the emitted lasant optical radiation at said second wavelength within said non-linear and lasant members.

26. The apparatus of claim 25 wherein said internally reflective faces of said non-linear and lasant members are coated so as to be internally reflective at said second wavelength.

* * * * *